US012724938B2

(12) United States Patent
Takeda

(10) Patent No.: US 12,724,938 B2
(45) Date of Patent: Sep. 1, 2026

(54) SIMULATOR

(71) Applicant: FANUC CORPORATION, Minamitsuru-gun (JP)

(72) Inventor: Toshiya Takeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1071 days.

(21) Appl. No.: 17/795,636

(22) PCT Filed: May 6, 2021

(86) PCT No.: PCT/JP2021/017389
§ 371 (c)(1),
(2) Date: Jul. 27, 2022

(87) PCT Pub. No.: WO2021/225140
PCT Pub. Date: Nov. 11, 2021

(65) Prior Publication Data

US 2023/0073912 A1 Mar. 9, 2023

(30) Foreign Application Priority Data

May 8, 2020 (JP) ................................ 2020-082572

(51) Int. Cl.
*G06F 113/08* (2020.01)
*G06F 30/20* (2020.01)

(52) U.S. Cl.
CPC .......... *G06F 30/20* (2020.01); *G06F 2113/08* (2020.01)

(58) Field of Classification Search
CPC . G06F 2113/08; B05B 12/084; B05B 12/122; B05B 12/10; B05B 13/0431
See application file for complete search history.

(56) References Cited

U.S. PATENT DOCUMENTS 5,521,477 A 5/1996 Sasaki

FOREIGN PATENT DOCUMENTS

CN 101878071 11/2010
CN 103317846 9/2013
(Continued)

OTHER PUBLICATIONS

Kim et al. Computational Fluid Dynamics Model for thickness and Uniformity Prediction of Coating Layer in Slot-Die Process, International Journal of Advanced Manufacturing Technology, 2019, pp. 2991-2997 (Year: 2019).*
(Continued)

*Primary Examiner* — Rehana Perveen
*Assistant Examiner* — Cuong V Luu
(74) *Attorney, Agent, or Firm* — Wenderoth, Lind & Ponack, L.L.P.

(57) ABSTRACT

A simulator comprises a fluid property acquiring unit for acquiring the properties of a fluid to be discharged; a mesh division unit for dividing the surface of a CAD model for a workpiece into meshes; an application amount calculation unit for calculating the amount of the fluid applied to each mesh; a maximum film thickness calculation unit for calculating the maximum film thickness of the fluid that each mesh can hold; and a first moving amount calculation unit for calculating, for each mesh, a first moving amount by which the fluid in an amount determined by the properties of the fluid moves relative to the mesh located at a position lower than said each mesh among the meshes adjacent to said each mesh when the film thickness of the applied fluid is larger than the maximum film thickness of the fluid that each mesh can hold.

6 Claims, 10 Drawing Sheets

(56) References Cited

FOREIGN PATENT DOCUMENTS

| | | | |
|---|---|---|---|
| CN | 106999962 | 8/2017 | |
| JP | 5-76805 | 3/1993 | |
| JP | 7-112148 | 5/1995 | |
| JP | 11-276978 | 10/1999 | |
| JP | 2002-172350 | 6/2002 | |
| JP | 2004-286589 | 10/2004 | |
| JP | 2004-344845 | 12/2004 | |
| JP | 2006-122830 | 5/2006 | |
| JP | 2010-274185 | 12/2010 | |
| JP | 2012-11416 | 1/2012 | |
| JP | 2012-206114 | 10/2012 | |
| WO | 2006/046536 | 5/2006 | |
| WO | WO-2006046536 A1 * | 5/2006 | ............... B05D 1/02 |

OTHER PUBLICATIONS

Li et al. Paint Deposition Simulation for Robotics Automotive Painting Line 4th Annual IEEE International Conference on Cyber Technology in Automation, Control and Intelligent Systems, Jun. 4-7, 2014, (Year: 2014).*

International Search Report issued Jul. 6, 2021 in corresponding International Application No. PCT/JP2021/017389.

* cited by examiner

FIG. 5

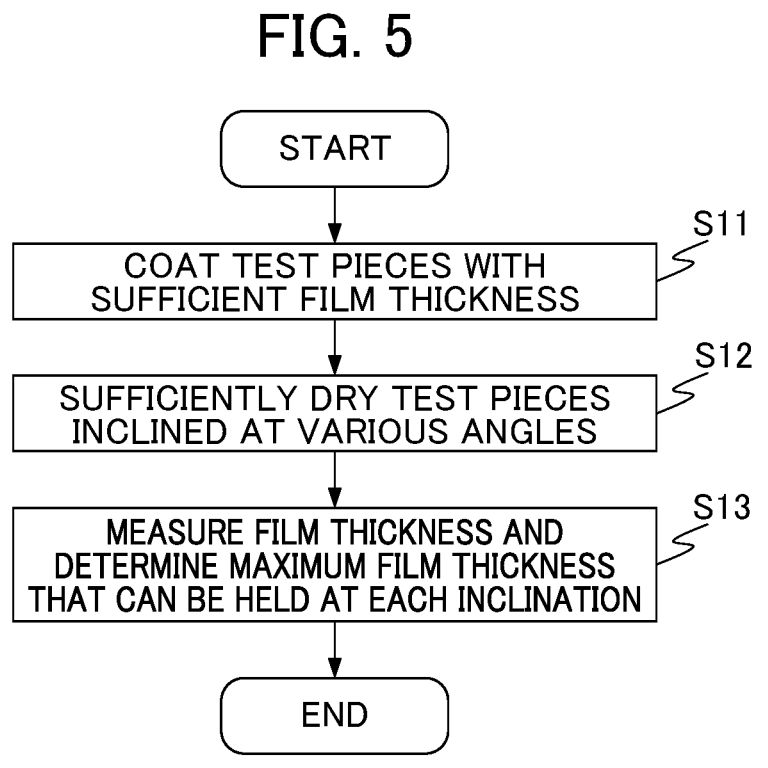

START

S11 COAT TEST PIECES WITH SUFFICIENT FILM THICKNESS

S12 SUFFICIENTLY DRY TEST PIECES INCLINED AT VARIOUS ANGLES

S13 MEASURE FILM THICKNESS AND DETERMINE MAXIMUM FILM THICKNESS THAT CAN BE HELD AT EACH INCLINATION

END

SIMULATOR

BACKGROUND OF THE INVENTION

Technical Field

The present invention relates to a simulator.

Background Art

There is known a technique for computing a result of application of paint on a workpiece in a spraying operation of a robot.

More specifically, a teaching program for the robot is analyzed to record positions of a spray nozzle attached to the robot and an open/closed state of the nozzle in units of interpolation cycles, and a surface of a CAD model of a workpiece is divided into fine triangular meshes. In this state, computation is performed to determine which ones of the triangular meshes the paint discharged every moment from the position of the nozzle adheres to, in units of interpolation cycles. In this way, the amount of paint applied by way of a series of operations is calculated in units of the triangular mesh. Thereby, a thickness of a film of the applied paint can be calculated from an area of the triangular mesh and the amount of paint (for example, see Patent Document 1).

Patent Document 1: Japanese Unexamined Patent Application, Publication No. H07-112148

DISCLOSURE OF THE INVENTION

Problems to be Solved by the Invention

In the field of simulation of the spraying operation of robots, there is a problem that a fluctuation in film thickness that occurs after application of paint to a workpiece is not simulated in consideration of viscosity of the paint.

It is an object of the present invention to provide a simulator capable of simulating a fluctuation in film thickness in consideration of viscosity of paint after the paint is applied to a workpiece.

Means for Solving the Problems

An aspect of the present disclosure provides a simulator for simulating movement of a fluid discharged to a workpiece. The simulator includes: a fluid property acquiring unit that acquires a property of the fluid to be discharged; a drying time acquiring unit that acquires a time required for the fluid to be discharged to reach a predetermined degree of dryness; a mesh division unit that divides a surface of a CAD model of the workpiece into meshes; an application amount calculation unit that calculates an amount of a fluid applied to each mesh; a maximum film thickness calculation unit that calculates, for each mesh, a maximum film thickness of the fluid that can be held in the mesh, from an inclination of the mesh with respect to a gravity direction and the property of the fluid; and a first moving amount calculation unit that calculates, for each mesh, a first moving amount in a case where a film thickness of the applied fluid is larger than the maximum film thickness of the fluid that can be held in the mesh, the first moving amount being an amount which is determined by the property of the fluid and by which the fluid moves to a mesh located at a position lower than the mesh among meshes adjacent to the mesh.

Effects of the Invention

According to an aspect, it is possible to simulate a fluctuation in film thickness that occurs after application of paint to a workpiece, in consideration of viscosity of the paint.

BRIEF DESCRIPTION OF THE DRAWINGS

FIG. 5 is a flowchart showing a procedure at the time of acquiring measurement data of the maximum film thickness according to the embodiment;

FIG. 8 is a view for describing a swelling amount calculated by a swelling amount calculation unit 120 according to the embodiment;

FIG. 9 is a view for describing a crack predicted by a crack prediction unit 121 according to the embodiment;

PREFERRED MODE FOR CARRYING OUT THE INVENTION

Hereinafter, an embodiment of the present invention will be described with reference to FIGS. 1 to 11.

1. Overall Configuration

Figure 1:
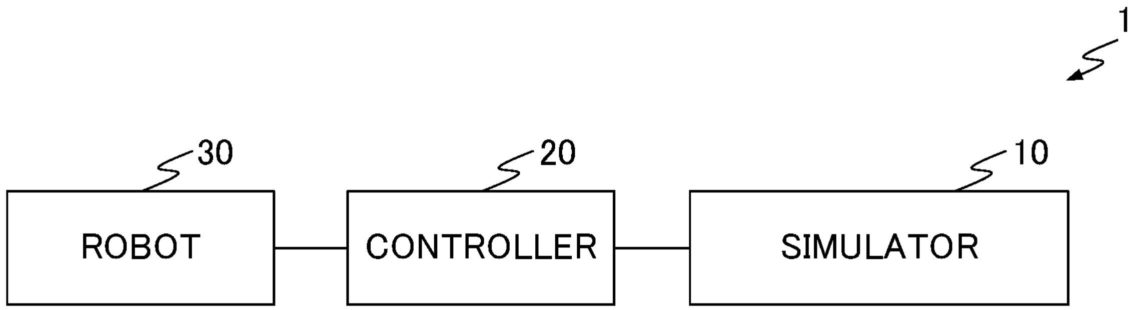
FIG. 1 is an overall block diagram of a simulation system according to an embodiment.

FIG. 1 shows an overall configuration of a simulation system 1 according to the present embodiment. As shown in FIG. 1, the simulation system 1 includes a simulator 10, a controller 20, and a robot 30.

The simulator 10 is a device that simulates movement of a fluid discharged to a workpiece by the robot 30. The “fluid” herein may be, for example, paint to be applied to a surface of the workpiece. Further, the term “paint” used herein may be oil-based paint containing drying oil as a main component, lacquer containing nitrocellulose as a main component, synthetic resin paint containing synthetic resin as a main component, and liquid paint such as alcoholic paint containing shellac as a main component, or may be powder paint formed by a color-developing component and a film-forming component without using a solvent.

The controller 20 stores a motion program, teaching data, and the like for controlling a motion of the robot 30. The teaching data includes path data regarding a position and a posture that the robot 30 and a tool take to apply a fluid to the workpiece in a path such as an arc, a straight line, or a combination thereof. The teaching data is input by an operator through a teach pendant (not shown), for example. The controller 20 creates a motion program for controlling the motion of the robot 30 based on the teaching data. The controller 20 controls the motion of the robot 30 based on the path data based on the motion program, a speed command (constant speed), and a position feedback and a speed feedback from an encoder to control the position and the posture of the robot 30 and the position and the posture of a painting machine as a tool and to control a relative position between the painting machine as a tool and the workpiece.

Figure 2:
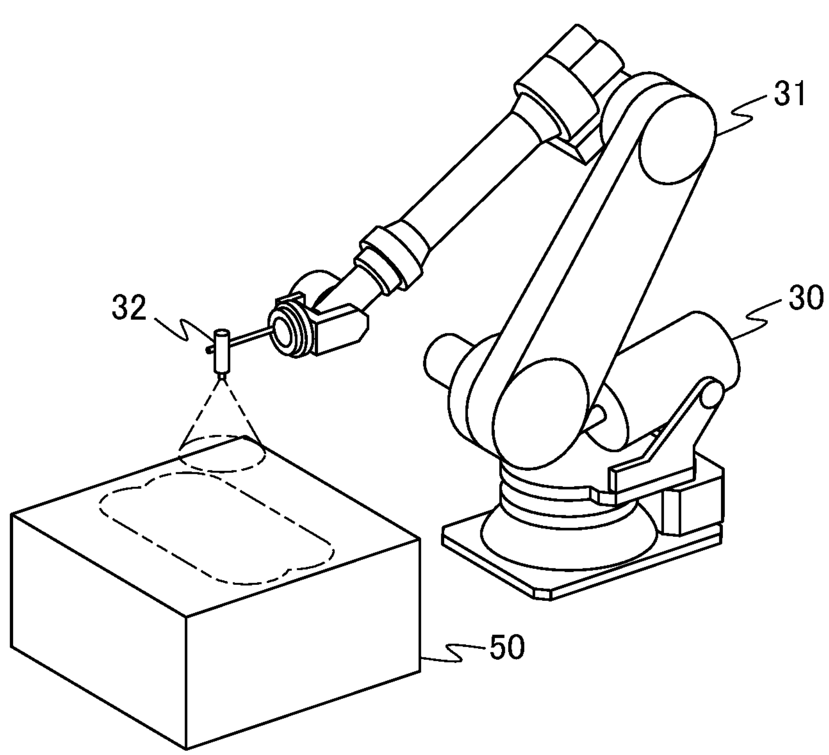
FIG. 2 is an appearance of a robot according to the embodiment.

The robot 30 is a device that applies paint to the workpiece. FIG. 2 shows an appearance of the robot 30. The robot 30 is provided with a robot arm 31. Further, a painting machine 32 is provided at a distal end of the robot arm 31. The robot 30 is taught by the controller 20 about data for a moving route of the painting machine 32 along the surface to be painted of the workpiece 50. Based on the teaching data, the robot 30 moves the robot arm 31 and the painting machine 32, and adjusts a hydraulic pressure of the paint to be discharged to the workpiece 50 from the painting machine 32, thereby adjusting the amount of discharge of the paint.

2. Configuration of Simulator

Figure 3:
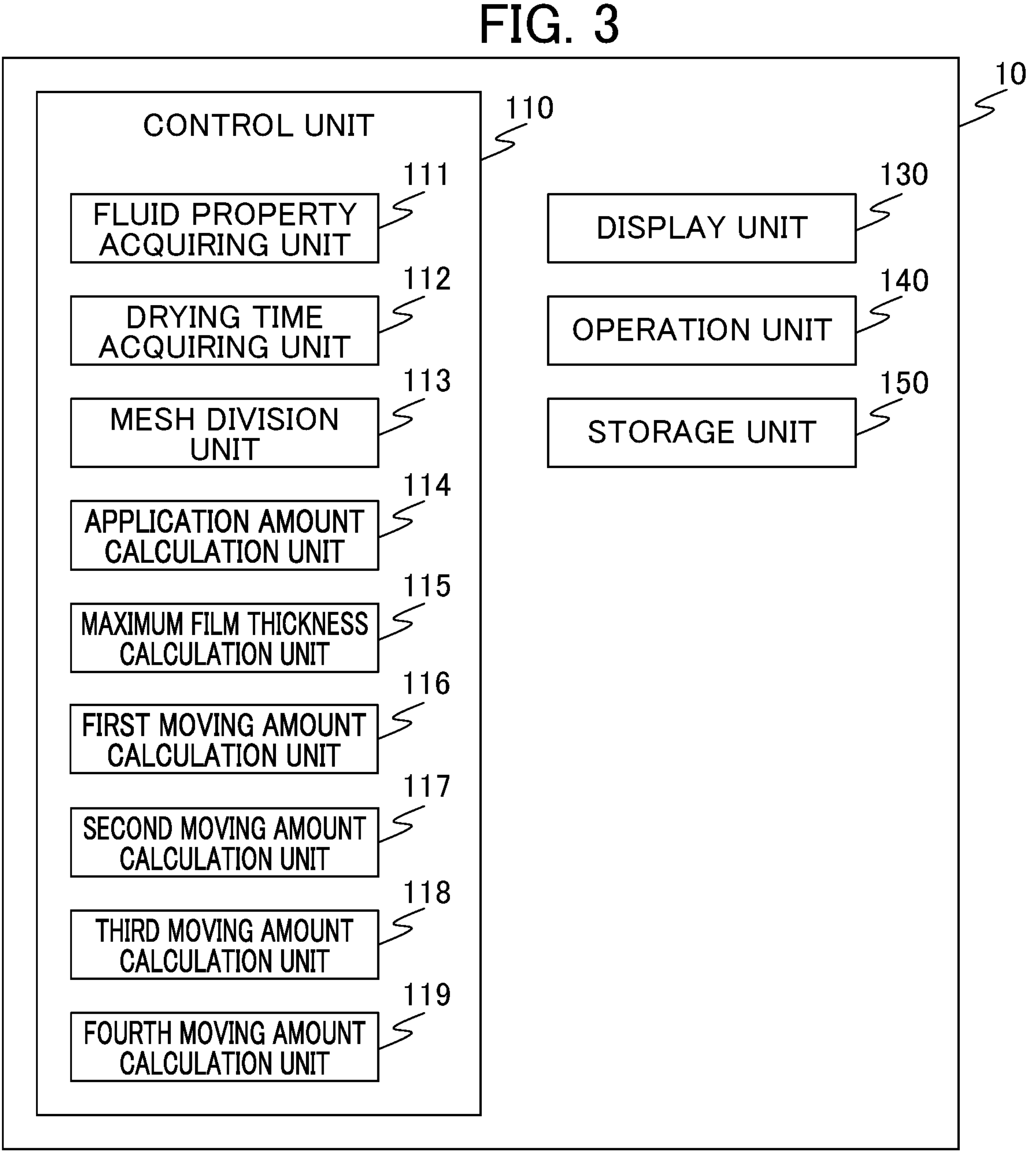
FIG. 3 is a functional block diagram of a simulator according to the embodiment.

FIG. 3 is a functional block diagram showing functions of the simulator 10. As shown in FIG. 3, the simulator 10 includes a control unit 110, a display unit 130, an operation unit 140, and a storage unit 150.

The control unit 110 is a unit that controls the entire simulator 10, and reads and executes, as needed, various programs from a storage zone such as a ROM, a RAM, a flash memory, or a hard disk (HDD), thereby realizing various functions in the present embodiment. The control unit 110 may be a CPU. The control unit 110 includes a fluid property acquiring unit 111, a drying time acquiring unit 112, a mesh division unit 113, an application amount calculation unit 114, a maximum film thickness calculation unit 115, a first moving amount calculation unit 116, a second moving amount calculation unit 117, a third moving amount calculation unit 118, and a fourth moving amount calculation unit 119.

The fluid property acquiring unit 111 acquires a property value of the fluid to be applied to the workpiece 50. For example, when the fluid is paint, the fluid property acquiring unit 111 acquires a viscosity value of the paint as an example. However, the property of the fluid is not limited to the viscosity, and the fluid property acquiring unit 111 can acquire other properties, such as a concentration of the paint. Further, the fluid property acquiring unit 111 may acquire a property input by the operator of the simulator 10 through an operation of the operation unit 140 to be described below, or may acquire a property stored in advance in the storage unit 150 to be described below.

The drying time acquiring unit 112 acquires a drying time of the fluid to be applied to the workpiece 50. Here, the "drying time" is a time required for the fluid to reach a predetermined degree of dryness, which varies depending on the type of each fluid and temperature and humidity of a place where the workpiece coated with the fluid is placed. Here, the "predetermined degree of dryness" may be a degree indicating a complete dry state, or may be a degree indicating a so-called "semi-dry" state. The drying time acquiring unit 112 may acquire a value of the drying time input by the operator of the simulator 10 through an operation of the operation unit 140 to be described below, or may acquire a value of the drying time stored in advance in the storage unit 150 to be described below.

Figure 4:
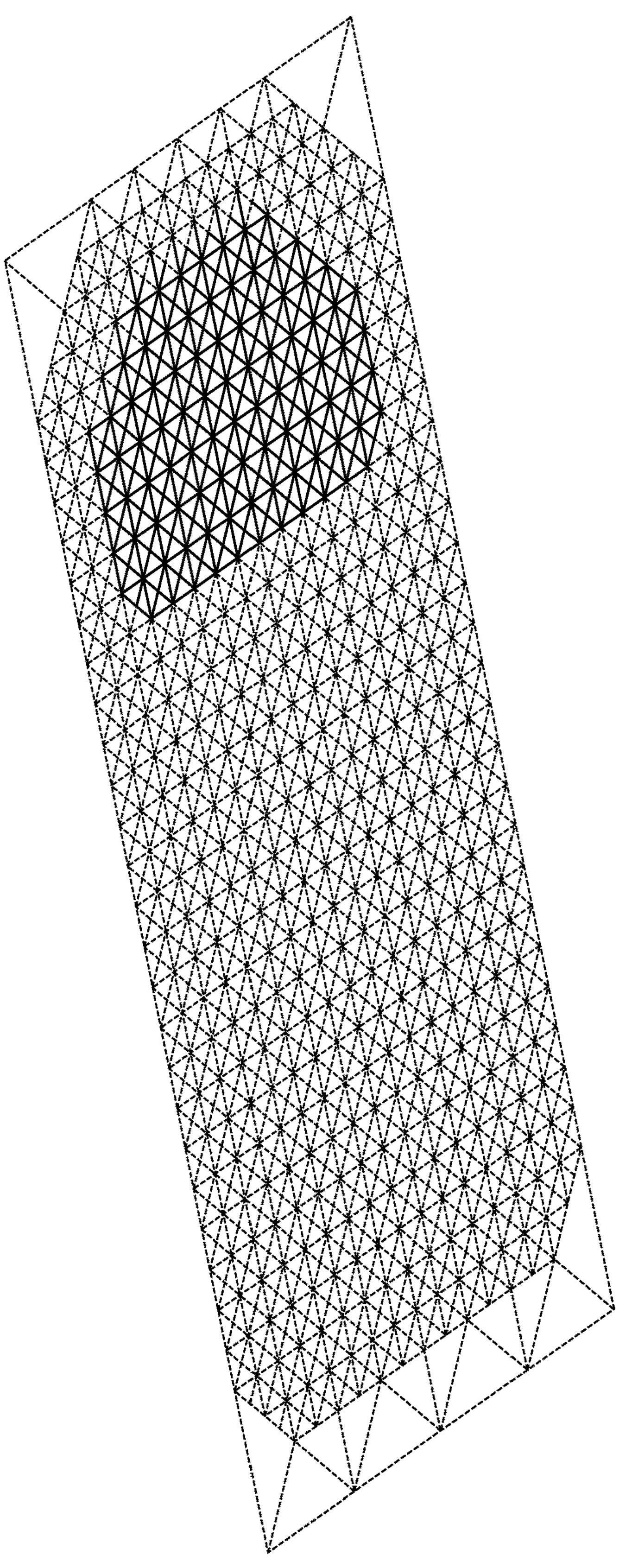
FIG. 4 is a view showing an example in which an application zone is divided into meshes by the simulator according to the embodiment.

The mesh division unit 113 divides a surface of a CAD model of a workpiece 50 into meshes. FIG. 4 shows an example of a divided mesh. More specifically, FIG. 4 shows an example in which the application zone on an upper surface of the workpiece 50 shown in FIG. 2 is divided into meshes. In the example shown in FIG. 4, since the application zone is a flat surface, the application zone is divided into a triangular mesh, but this is a non-limiting example. In particular, when the application zone has a three-dimensional shape, it is preferable that the application zone is divided into a square mesh or a hexagonal mesh. It is suitable to increase the number of adjacent meshes in order to improve the accuracy of a simulation to be described below.

The application amount calculation unit 114 calculates the amount of fluid applied to each of the meshes. For example, the application amount calculation unit 114 calculates the amount of fluid applied to each of the meshes by analyzing the motion program used when the controller 20 operates the robot 30.

The maximum film thickness calculation unit 115 calculates, for each mesh, the maximum film thickness of the fluid, which can be held in each mesh, from an inclination of the mesh with respect to a gravity direction and a property of the fluid to be applied to the mesh. The maximum film thickness may be calculated in such a manner that behaviors of particles constituting the fluid (for example, particles of the paint) are simulated by a hydrodynamic method, or may be a maximum film thickness measured by way of an experiment.

FIG. 5 is a flowchart showing a procedure for acquiring measurement data of the maximum film thickness by way of an experiment.

In Step S11, a sufficiently large amount of fluid (paint) is applied to test pieces.

In Step S12, the test pieces are sufficiently dried while being inclined at various angles.

In Step S13, a film thickness of each test piece is measured, and the maximum film thickness that can be held at each inclination angle is determined.

When the film thickness of the applied fluid is larger than the maximum film thickness of the fluid that can be held in each mesh, the first moving amount calculation unit 116 calculates, for each mesh, a first moving amount which is determined by the property of the fluid and by which the fluid moves to a mesh located at a position lower than the mesh among meshes adjacent to the mesh.

Specifically, a fluid exceeding the limit of the film thickness that can adhere to each mesh drips down and moves due to the influence of gravity. The first moving amount calculation unit 116 calculates this moving amount of the fluid, which drips down and moves, as the first moving amount.

More specifically, the first moving amount calculation unit 116 first calculates a height of a liquid level of the fluid for each mesh. At this time, a value used as the "height" of the liquid level is a value of a position in a height direction that is away in a normal direction of the mesh from the center point of the mesh by the film thickness. For example, when heights of liquid levels of two or more meshes adjacent to one mesh are lower than the height of the liquid level of the one mesh, the first moving amount calculation unit 116 may determine a ratio of fluid moving to each of the adjacent meshes based on a ratio of the difference in height.

This is repeated for each mesh until the film thickness of the mesh reaches a holdable film thickness or the mesh and the adjacent meshes have the same height of the liquid level, whereby the paint does not move.

When there is no mesh located lower than a certain mesh at the end of the workpiece 50, it is regarded that the fluid falls away from the workpiece 50 to be coated. Further, a film thickness of a dented portion may exceed the film thickness that can be held in the mesh, assuming that the dripping fluid accumulates there.

The first moving amount may be calculated in such a manner that behaviors of particles constituting the fluid (for example, particles of the paint) are simulated by a hydrodynamic method, or may be a moving amount measured by way of an experiment. A procedure for such an experiment will be described below with reference to FIG. 10.

The second moving amount calculation unit 117 makes, for each mesh, a comparison between the film thickness of the fluid in the mesh and the film thickness of the fluid in a mesh adjacent to the mesh, and calculates a second moving amount by which a part of the fluid in one with the larger film thickness of the meshes subjected to the comparison to the other with the smaller film thickness.

Figure 6A:
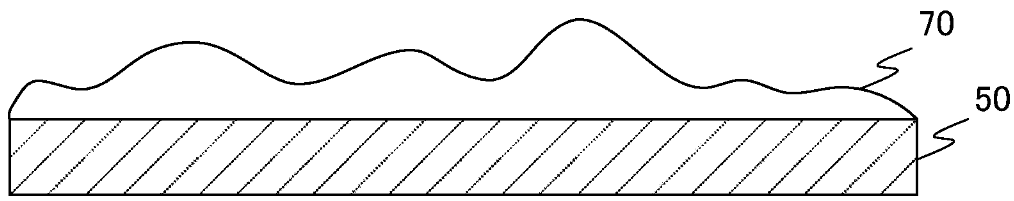
FIG. 6A is a view showing a state in which a part of a fluid applied to a mesh with a large film thickness moves to a mesh with a small film thickness according to the embodiment.
Figure 6B:
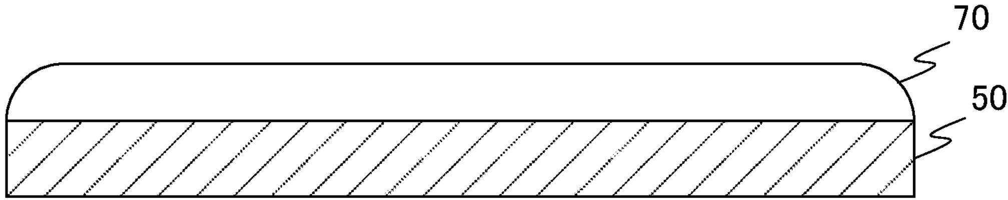
FIG. 6B is a view showing another state in which a part of a fluid applied to a mesh with a large film thickness moves to a mesh with a small film thickness according to the embodiment.

FIGS. 6A and 6B are views showing a state in which a part of the fluid applied to a mesh in a larger film thickness moves to a mesh with a smaller film thickness. As a result of application of the fluid to the workpiece 50, the amount (film thickness) of the fluid applied to the meshes has uneven application, that is, shading. For example, a large amount of fluid is applied to a location where the motion of the robot 30 has been slow or a location where two or more coats of the fluid have been applied. As shown in FIG. 6A, when the film thickness is uneven due to the uneven application, the fluid moves such that the film thickness becomes uniform as shown in FIG. 6B due to the influence of surface tension that acts to minimize the surface area of the fluid. The second moving amount calculation unit 117 calculates this moving amount of the fluid. The second moving amount may be calculated in such a manner that behaviors of particles constituting the fluid (for example, particles of the paint) are simulated by a hydrodynamic method, or may be a moving amount measured by way of an experiment. A procedure for such an experiment will be described below with reference to FIG. 10.

The third moving amount calculation unit 118 calculates, for the application zone of the fluid on the workpiece 50, a third moving amount by which the fluid that moves between the meshes constituting the application zone, due to the passage of time.

Figure 7:
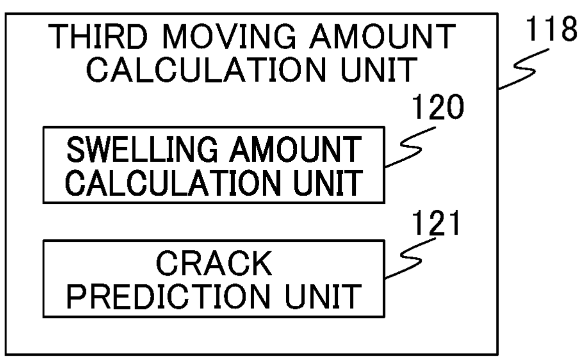
FIG. 7 is a block diagram showing a configuration of a third moving amount calculation unit 118 according to the embodiment.

FIG. 7 is a block diagram showing a configuration of the third moving amount calculation unit 118. The third moving amount calculation unit 118 includes a swelling amount calculation unit 120 and a crack prediction unit 121.

Figures 8, 9:
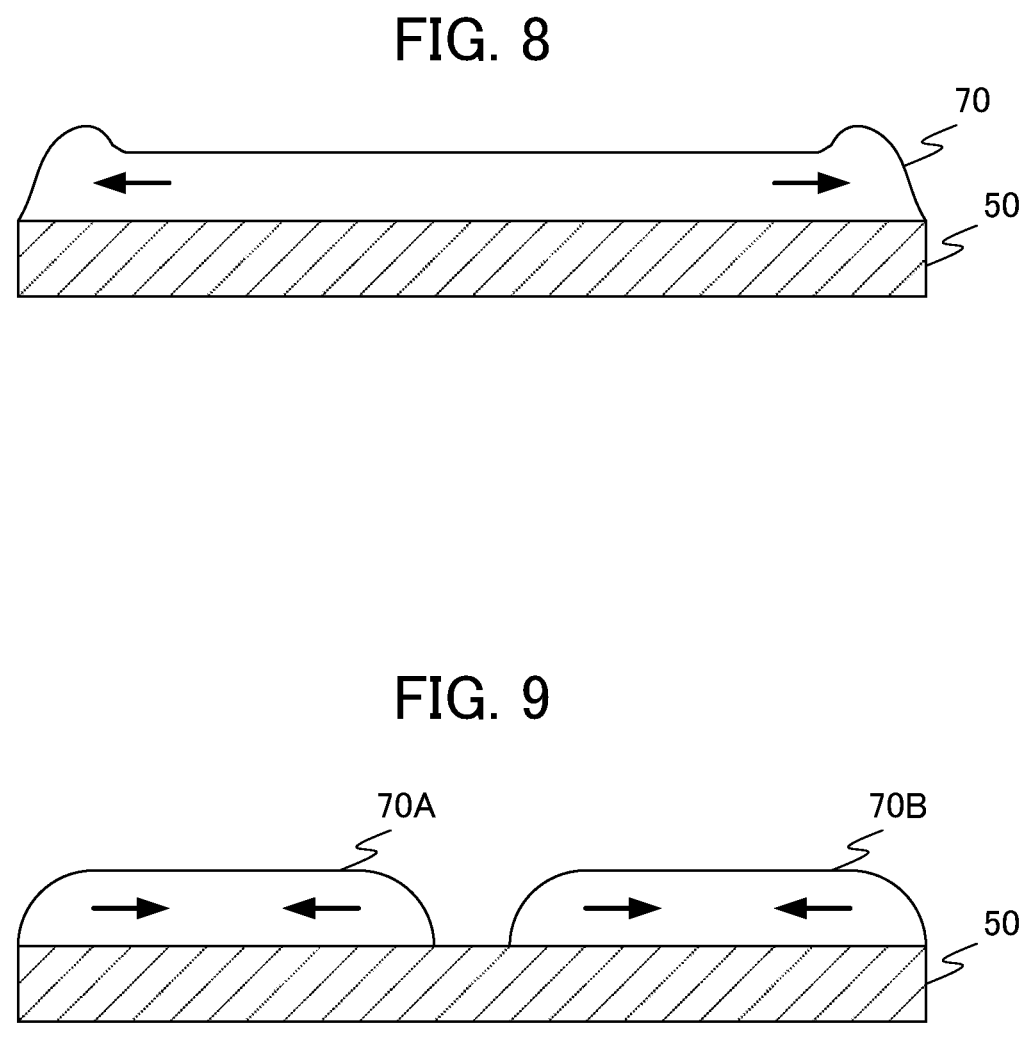

The swelling amount calculation unit 120 calculates a swelling amount by which the fluid swells at ends of the application zone on the workpiece 50 as the fluid dries. FIG. 8 is a view for describing the swelling amount calculated by the swelling amount calculation unit 120. When the film thickness is excessively large in the application zone, the fluid 70 dries faster at the ends of the application zone, the surface tension becomes stronger, and the fluid 70 is pulled from the ends of the application zone as shown in FIG. 8, whereby the fluid 70 swells at the ends of the application zone. The swelling amount calculation unit 120 calculates the swelling amount of the fluid 70 at the ends of the application zone.

The crack prediction unit 121 predicts a crack on the surface of the application zone caused by a concentration of the fluid in the application zone on the fluid in the workpiece 50. FIG. 9 is a view for describing the crack predicted by the crack prediction unit 121. When the film thickness is excessively large in the application zone, the fluid 70 is condensed as the inside of the fluid 70 dries, and conversely, when the film thickness becomes more uneven and the fluid 70 is divided into a fluid 70A and a fluid 70B as shown in FIG. 9, the application zone is cracked. The crack prediction unit 121 predicts a shape and a size of the crack in the application zone.

The third moving amount calculation unit 118 calculates the third moving amount based on the swelling amount calculated by the swelling amount calculation unit 120 and the shape and the size of the crack predicted by the crack prediction unit 121. The third moving amount may be calculated in such a manner that behaviors of particles constituting the fluid (for example, particles of the paint) are simulated by a hydrodynamic method, or may be a moving amount measured by way of an experiment. A procedure for such an experiment will be described below with reference to FIG. 10.

The fourth moving amount calculation unit 119 calculates a fourth moving amount which is determined by the property of the fluid and by which the fluid moves from one mesh to another mesh adjacent to and located lower than the one mesh due to the inclination of the one mesh itself.

As described above, the fluid exceeding the maximum film thickness, which is the limit of the fluid that can adhere to each mesh, drips down and moves due to the influence of gravity. The first moving amount calculation unit 116 calculates a moving amount of the fluid, which drips down and moves from a mesh to a mesh, as the first moving amount. On the other hand, the fourth moving amount calculation unit 119 calculates, as the fourth moving amount, a small moving amount by which the fluid moves from one mesh to another mesh adjacent to and located lower than the one mesh without "dripping", due to the inclination of the one mesh itself. The fourth moving amount may be calculated in such a manner that behaviors of particles constituting the fluid (for example, particles of the paint) are simulated by a hydrodynamic method, or may be a moving amount measured by way of an experiment. A procedure for such an experiment will be described below with reference to FIG. 10.

Figure 10:
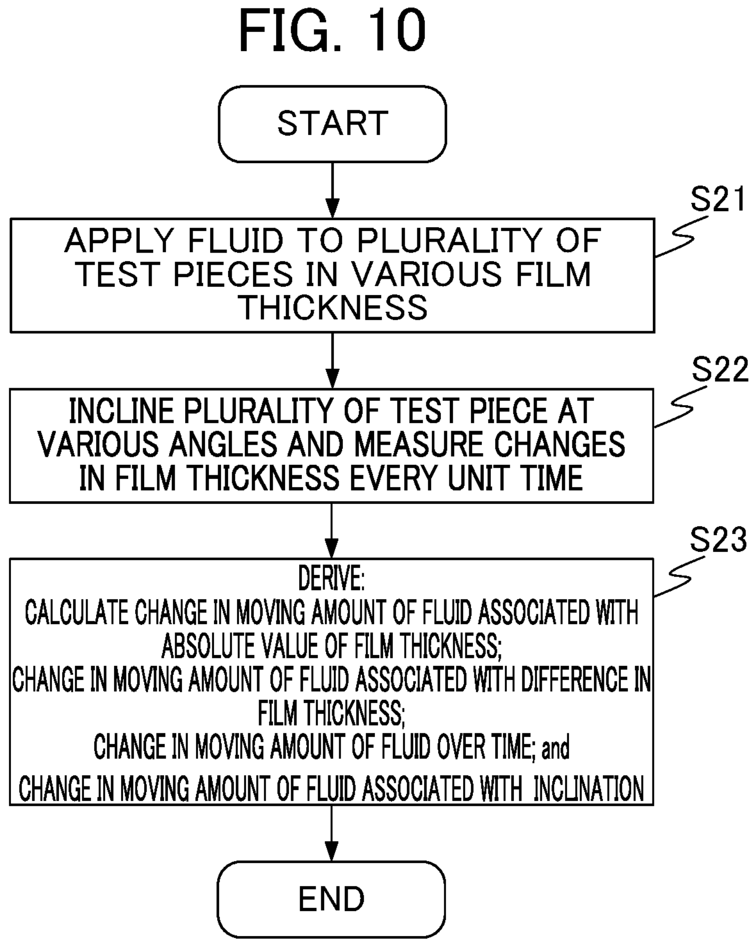
FIG. 10 is a flowchart showing a procedure for acquiring measurement data used when a first moving amount calculation unit 116 to a fourth moving amount calculation unit 119 calculate a moving amount.

FIG. 10 is a flowchart showing a procedure for acquiring measurement data to be used when the first moving amount calculation unit 116 to the fourth moving amount calculation unit 119 calculate the first moving amount to fourth moving amount.

In Step S21, the fluid is applied to a plurality of test pieces at various film thicknesses.

In Step S22, the plurality of test pieces coated with the fluid are inclined at various angles, and changes in film thickness are measured every unit time. At this time, various phenomena occurring in the applied fluid are comprehensively measured by an increase in variation of application unevenness.

In Step S23, based on the data of the changes in film thickness measured every unit time, the change in moving amount of the fluid associated with the absolute value of the film thickness, the change in moving amount of the fluid associated with the difference in film thickness, the change in moving amount of the fluid over time, and the change in moving amount of the fluid associate with the inclination of the workpiece 50 are derived. Since the fluid dries with the passage of time, the moving amount of the fluid changes over time.

Returning to FIG. 3, the display unit 130 is a device that displays simulation results of the simulator 10 and various data used in the simulation. The display unit 130 can be implemented, for example, a liquid crystal monitor.

The operation unit 140 is a device used at the time of the operation of the simulator 10. A user of the simulator 10 operates the operation unit 140 to input, to the simulator 10, data such as the property value of the fluid (e.g., the viscosity of paint) and the drying time of the fluid (e.g., paint). The operation unit 140 may be implemented by, for example, a keyboard or a mouse, or may be implemented by a touch panel laminated on a monitor as the display unit 130.

The storage unit 150 is a device that stores the simulation results of the simulator 10 and various data used in the simulation.

3. Operation According to Present Embodiment

Figure 11:
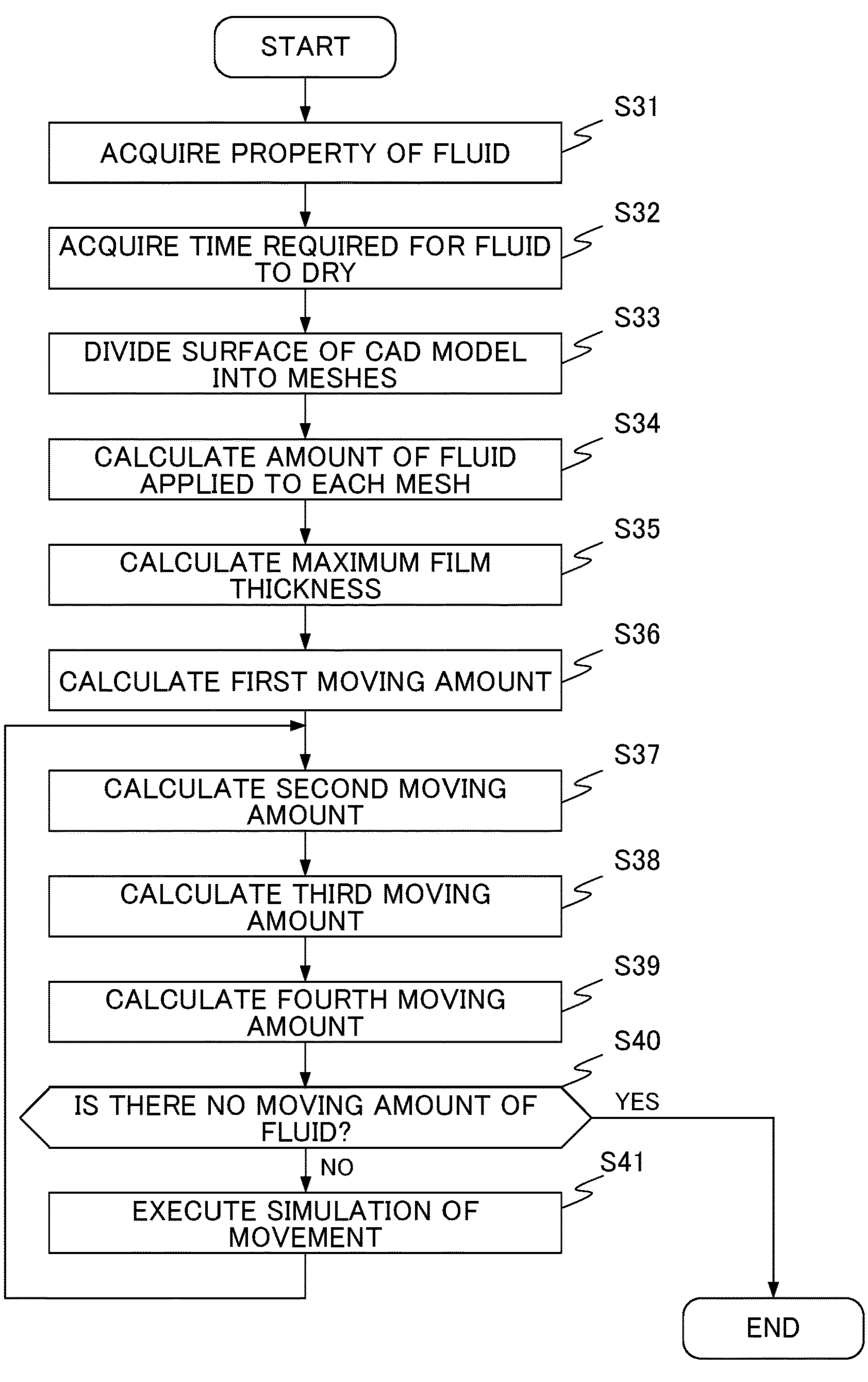
FIG. 11 is a flowchart showing an operation of the simulator according to the embodiment.

FIG. 11 is a flowchart showing an operation of the simulator 10.

In Step S31, the fluid property acquiring unit 111 acquires the property value of the fluid. For example, the fluid property acquiring unit 111 acquires the property value such as the viscosity value of the paint input to the simulator 10 by the operator of the simulator 10 through the operation of the operation unit 140.

In Step S32, the drying time acquiring unit 112 acquires the drying time required for the fluid to dry. For example, the drying time acquiring unit 112 acquires the value of the drying time of the paint input to the simulator 10 by the operator of the simulator 10 through the operation of the operation unit 140.

In Step S33, the mesh division unit 113 divides the surface of the CAD model of the workpiece 50 into meshes.

In Step S34, the application amount calculation unit 114 calculates the amount of fluid applied to each mesh.

In Step S35, the maximum film thickness calculation unit 115 calculates, for each mesh, the maximum film thickness of the fluid that can be held in each mesh, from the inclination of the mesh with respect to the gravity direction and the property of the fluid to be applied to the mesh.

In Step S36, the first moving amount calculation unit 116 calculates, for each mesh, the first moving amount in a case where the film thickness of the applied fluid is larger than the maximum film thickness of the fluid that can be held in the mesh, the first moving amount being an amount which is determined by the property of the fluid and by which the fluid moves to a mesh located at a position lower than the mesh among meshes adjacent to the mesh.

In general, the movement (dripping) of the fluid due to the influence of gravity is considered to be sufficiently faster than the movement due to the influence of surface tension, and thus, the movement of the fluid due to the influence of gravity is simulated first.

In Step S37, the second moving amount calculation unit 117 makes, for each mesh, a comparison between a film thickness of the fluid in the mesh and a film thickness of the fluid in a mesh adjacent to the mesh, and calculates the second moving amount by which a part of the fluid in one with a larger film thickness of the meshes subjected to the comparison to the other with a smaller film thickness.

In Step S38, the third moving amount calculation unit 118 calculates, for the application zone of the fluid on the workpiece 50, the third moving amount by which the fluid moves between the meshes constituting the application zone due to the passage of time.

In Step S39, the fourth moving amount calculation unit 119 calculates the fourth moving amount which is determined by the property of the fluid and by which the fluid moves from one mesh to another mesh adjacent to and located lower than the one mesh due to the inclination of the one mesh itself.

In Step S40, when there is no moving amount of the fluid, that is, when the first moving amount to the fourth moving amount are all zero (YES in S40), all the processes are ended. When the moving amount of the fluid still remains (NO in S40), the process proceeds to Step S41.

In Step S41, the control unit 110 simulates the movement of the fluid on the surface of the workpiece 50 coated with the fluid, based on the first moving amount to the fourth moving amount calculated by the first moving amount calculation unit 116 to the fourth moving amount calculation unit 119. Thereafter, the process returns to Step S37.

4. Effects of Present Embodiments (1) The simulator (for example, the "simulator 10" described above) according to the present embodiment is a simulator for simulating movement of a fluid discharged to the workpiece (for example, the "workpiece 50" described above), the simulator including: the fluid property acquiring unit (for example, the "fluid property acquiring unit 111" described above) that acquires the property of the fluid to be discharged; the drying time acquiring unit (for example, the "drying time acquiring unit 112" described above) that acquires the time required for the fluid to be discharged to reach the predetermined degree of dryness; the mesh division unit (for example, the "mesh division unit 113" described above) that divides the surface of the CAD model of the workpiece into meshes; the application amount calculation unit (for example, the "application amount calculation unit 114" described above) that calculates the amount of the fluid applied to each mesh; the maximum film thickness calculation unit (for example, the "maximum film thickness calculation unit 115" described above) that calculates, for each mesh, the maximum film thickness of the fluid that can be held in the mesh, from the inclination of the mesh with respect to the gravity direction and the property of the fluid; and the first moving amount calculation unit (for example, the "first moving amount calculation unit 116" described above) that calculates, for each mesh, the first moving amount in a case where the film thickness of the applied fluid is larger than the maximum film thickness of the fluid that can be held in the mesh, the first moving amount being an amount which is determined by the property of the fluid and by which the fluid moves to a mesh located at the position lower than the mesh among meshes adjacent to the mesh.

Thus, after the robot 30 applies the fluid to the workpiece 50, it is possible to simulate a minute fluctuation in film thickness due to the influence of gravity, based on the property of the fluid.

(2) The simulator according to (1) above may further include the second moving amount calculation unit (for example, the "second moving amount calculation unit 117" described above) that makes, for each mesh, a comparison between a film thickness of the fluid in the mesh and a film thickness of the fluid in a mesh adjacent to the mesh, and calculates the second moving amount by which a part of the fluid in one with a larger film thickness of the meshes subjected to the comparison to the other with a smaller film thickness.

Thus, after the robot 30 applies the fluid to the workpiece 50, it is possible to simulate a minute fluctuation in film thickness due to the influence of surface tension, based on the property of the fluid.

(3) The simulator according to (1) or (2) above may further include the third moving amount calculation unit (for example, the "third moving amount calculation unit 118" described above) that calculates, for the application zone of the fluid on the workpiece, the third moving amount by which the fluid moves between meshes constituting the application zone due to the passage of time.

Thus, after the robot 30 applies the fluid to the workpiece 50, it is possible to simulate a minute fluctuation in film thickness due to the influence of the passage of time, based on the property of the fluid.

(4) In the simulator according to (3) above, the third moving amount calculation unit may include the swelling amount calculation unit (for example, the "swelling amount calculation unit 120" described above) that calculates the swelling amount by which the fluid swells at ends of the application zone on the workpiece as the fluid dries, and may calculate the third moving amount based on the swelling amount calculated by the swelling amount calculation unit.

Thus, after the robot 30 applies the fluid to the workpiece 50, it is possible to simulate a minute fluctuation in film thickness due to the influence of the swelling of the fluid at the ends of the application zone, based on the property of the fluid.

(5) In the simulator according to (3) or (4) above, the third moving amount calculation unit may include the crack prediction unit (for example, the "crack prediction unit 121" described above) that predicts the crack on the surface of the application zone caused by the concentration of the fluid in the application zone of the fluid on the workpiece, and may calculate the third moving amount based on the crack predicted by the crack prediction unit.

Thus, after the robot 30 applies the fluid to the workpiece 50, it is possible to simulate a minute fluctuation in film thickness due to the influence of the cracks in the application zone, based on the property of the fluid.

(6) The simulator according to (1) to (5) above may further include the fourth moving amount calculation unit (for example, the "fourth moving amount calculation unit 119" described above) that calculates, for each mesh, the fourth moving amount which is determined by the property of the fluid and by which the fluid moves to a mesh adjacent to and located lower than the mesh due to an inclination of the mesh itself.

Thus, after the robot 30 applies the fluid to the workpiece 50, it is possible to simulate a minute fluctuation in film thickness due to the influence of the inclination of the mesh constituting the surface of the workpiece 50, based on the property of the fluid.

EXPLANATION OF REFERENCE NUMERALS

1: Simulation system
10: Simulator
20: Controller
30: Robot
110: Control unit
111: Fluid property acquiring unit
112: Drying time acquiring unit
113: Mesh division unit
114: Application amount calculation unit
115: Maximum film thickness calculation unit
116: First moving amount calculation unit
117: Second moving amount calculation unit
118: Third moving amount calculation unit
119: Fourth moving amount calculation unit

The invention claimed is:

1. A simulation system for simulating movement of a fluid by a robot discharged to a workpiece, the simulation system comprising:
the robot;
a controller; and
a simulator,
wherein the simulator includes:
a fluid property acquiring unit that acquires a property of the fluid to be discharged;
a drying time acquiring unit that acquires a time required for the fluid to be discharged to reach a predetermined degree of dryness;
a mesh division unit that divides a surface of a Computer-Aided Design (CAD) model of the workpiece into meshes;
an application amount calculation unit that calculates an amount of the fluid applied to each mesh;
a maximum film thickness calculation unit that calculates, for each mesh, a maximum film thickness of the fluid that can be held in the mesh, from an inclination of the mesh with respect to a gravity direction and the property of the fluid; and
a first moving amount calculation unit that calculates, for each mesh, a first moving amount in a case where a film thickness of the applied fluid is larger than the maximum film thickness of the fluid that can be held in the mesh, the first moving amount being determined by the property of the fluid and by which the fluid moves to one of the meshes which is located at a position lower than the mesh among meshes adjacent to the mesh,
wherein:
the simulator performs a simulation of a fluctuation in the film thickness that occurs after application of the fluid to the workpiece; and
based on a result of the simulation, the controller controls an amount of the fluid to be discharged by the robot such that the film thickness after the fluctuation becomes equal to a predetermined film thickness.

2. The simulation system according to claim 1, further comprising a second moving amount calculation unit that makes, for each mesh, a comparison between the film thickness of the fluid in the mesh and the film thickness of the fluid in one of the meshes which is adjacent to the mesh, and calculates a second moving amount by which a part of the fluid in the mesh with the larger film thickness moves to the mesh with the smaller film thickness.

3. The simulation system according to claim 1, further comprising a third moving amount calculation unit that calculates, for an application zone of the fluid on the workpiece, a third moving amount by which the fluid moves between meshes constituting the application zone due to a passage of time.

4. The simulation system according to claim 3, wherein the third moving amount calculation unit includes a swelling amount calculation unit that calculates a swelling amount by which the fluid swells at an end of the application zone on the workpiece as the fluid dries, and the third moving amount calculation unit calculates the third moving amount based on the swelling amount calculated by the swelling amount calculation unit.

5. The simulation system according to claim 3, wherein the third moving amount calculation unit includes a crack prediction unit that predicts a crack on a surface of the application zone caused by a concentration of the fluid in the application zone of the fluid on the workpiece, and the third moving amount calculation unit calculates the third moving amount based on the crack predicted by the crack prediction unit.

6. The simulation system according to claim 1, further comprising a fourth moving amount calculation unit that calculates, for each mesh, a fourth moving amount which is determined by the property of the fluid and by which the fluid moves from one mesh to another mesh adjacent to and located lower than the one mesh due to an inclination of the one mesh itself.

* * * * *